United States Patent [19]
Kostohris et al.

[11] Patent Number: 5,493,954
[45] Date of Patent: Feb. 27, 1996

[54] SELF-VENTING SEAL ASSEMBLY

[75] Inventors: Kraig Kostohris, Maple Valley; Olivier L. Tremoulet, Jr., Edmonds; Thomas Sizemore, Federal Way; Larry Pearson, Sumner; Chidambaram Raghavan, Kent, all of Wash.

[73] Assignee: Flow International Corporation, Kent, Wash.

[21] Appl. No.: 342,381

[22] Filed: Nov. 18, 1994

[51] Int. Cl.$^6$ .................................... F16J 15/18
[52] U.S. Cl. .................. 92/168; 92/80; 92/82; 277/27; 277/29
[58] Field of Search .................. 92/168, 162 R, 92/240, 247, 80, 82; 277/27, 188 R, 205, 152, 29; 417/571

[56]  References Cited

U.S. PATENT DOCUMENTS

| | | | |
|---|---|---|---|
| 2,843,434 | 7/1958 | Orloff et al. | 277/29 |
| 2,876,025 | 3/1959 | Orloff et al. | 277/29 |
| 3,678,809 | 7/1972 | Doutt | 277/29 |
| 3,980,204 | 9/1976 | Jones et al. | 277/29 |
| 4,681,327 | 7/1987 | d'Agostino et al. | 277/29 |
| 5,050,895 | 9/1991 | Hashish et al. | 277/188 R |
| 5,111,736 | 5/1992 | Buchberger et al. | 92/168 |
| 5,135,238 | 8/1992 | Wells et al. | 277/71 |
| 5,328,178 | 7/1994 | Nies | 277/205 |

*Primary Examiner*—Thomas E. Denion
*Attorney, Agent, or Firm*—Seed and Berry

[57] ABSTRACT

A self-venting seal assembly for use in an ultrahigh-pressure pump is shown and described. In a preferred embodiment, a low-pressure seal is used to energize a high-pressure seal, the low-pressure seal having a "u" shaped cross-section, thereby creating a groove in a first end of the low-pressure seal. When the first end of the seal is exposed to pressurized fluid, it expands outwardly thereby substantially preventing the leakage of fluid past it. To the extent that any pressurized fluid does leak past the seal, which would act against a second end of the seal when the pressure on the opposite side of the seal drops, the seal compresses inwardly, thereby allowing the pressurized fluid to flow back past the seal.

In a preferred embodiment, the high-pressure seal comprises a sleeve seal having an annular opening through which the plunger reciprocates, the sleeve seal being supported by a backup ring, the backup ring also having an annular opening through which the plunger passes. The sleeve seal and backup ring are configured such that they may be placed in an annular bore of a seal carrier and an annular end surface of the sleeve seal and an annular surface of the backup ring abut each other and are substantially flush, thereby simplifying manufacturing and installation of the seal assembly.

13 Claims, 3 Drawing Sheets

SELF-VENTING SEAL ASSEMBLY

TECHNICAL FIELD

This invention relates to seals, and more particularly, to seals for use in connection with an ultrahigh-pressure liquid pump.

BACKGROUND OF THE INVENTION

Numerous tasks, for example, cutting and cleaning various materials and surfaces, may be accomplished through the use of a stream of pressurized fluid, typically water, which is generated by an ultrahigh-pressure, positive displacement pump. Such pumps pressurize a fluid by having a reciprocating plunger that draws fluid from an inlet area into a pressurization chamber during an intake stroke, and that acts against the fluid during a pumping stroke, thereby forcing pressurized fluid through an outlet valve to an outlet chamber. The pressurized fluid in the outlet chamber is then typically collected in a manifold to be used by an operator via whatever tool has been attached to the pump for a particular task.

In order to ensure that the pump operates as desired, it is necessary to seal the pressurization chamber and prevent the leakage of fluid. One current method of sealing uses an o-ring as a low-pressure seal that in turn energizes an associated high-pressure seal. However, the o-ring is exposed to a reversing pressure differential as the pressure in the chamber cycles from a high pressure during the pumping stroke to a low pressure during the intake stroke. These pressure cycles typically dislodge or damage the o-ring, causing the sealing assembly to fail.

Another current sealing method uses an o-ring and an adjacent vent hole, as described in U.S. Pat. No. 5,111,736, assigned to Flow International Corporation, the assignee of the present invention. However, while this type of sealing assembly provides acceptable results, applicants believe that the sealing characteristics and life may be improved and that manufacturing and installation may be simplified.

A need therefore exists for an improved sealing assembly that can withstand being exposed to cycling pressures and that is simple to manufacture and install.

SUMMARY OF THE INVENTION

It is therefore an object of this invention to provide an improved seal assembly.

It is another object of this invention to provide a seal assembly that will simplify the manufacture and installation of the seal assembly.

These and other objects of the invention, as will be apparent herein, are accomplished by providing a self-venting seal assembly that seals in one direction and vents in the opposite direction. In a preferred embodiment, the seal assembly is used in an ultrahigh-pressure pump, the pump having a plunger that reciprocates in a chamber, the plunger drawing a volume of fluid into the chamber on an intake stroke, and pressurizing the fluid on a pumping stroke.

The plunger passes through an annular, high-pressure sleeve seal, the sleeve seal being energized by an annular low-pressure seal that surrounds the sleeve seal and initiates the contact stresses needed by the sleeve seal to seal at ultrahigh pressures. The low-pressure seal is preferably provided with a first side and a second side, the first side being exposed to the pressurized fluid in the chamber. The seal is made of a deformable, resilient material, and has a "u" shaped cross-section, such that a groove created by the "u" shaped cross-section is provided in the first end of the seal.

As the plunger begins to pressurize the fluid in the chamber, the pressurized fluid acts against the first end of the "u" shaped or u-cup seal. However, given the configuration of the seal, it expands outwardly, thereby substantially preventing the leakage of fluid from the chamber past the seal. During the intake stroke, any pressurized fluid that may have leaked past the seal acts against the second end of the seal. However, given the configuration of the seal, the first end of the seal contracts inwardly towards the groove, such that the pressurized fluid is allowed to flow back past the first end into the chamber. In this manner, a seal provided in accordance with a preferred embodiment of the present invention seals in only one direction during the pumping stroke, and vents itself during the intake stroke, thereby preventing the buildup of pressure behind the seal that would otherwise dislodge or damage the seal.

The sleeve seal is supported by a backup ring having an annular opening through which the plunger passes, the sleeve seal and backup ring being aligned and positioned such that an annular end surface of the sleeve seal abuts an annular end surface of the backup ring, the two end surfaces being substantially flush. By providing a sleeve seal and backup ring in accordance with a preferred embodiment of the present invention, manufacturing costs are reduced given the simplicity of the shapes of the sleeve seal and backup ring, and installation and replacement of the backup ring and sleeve seal are simplified.

DETAILED DESCRIPTION OF THE INVENTION

Figure 1:
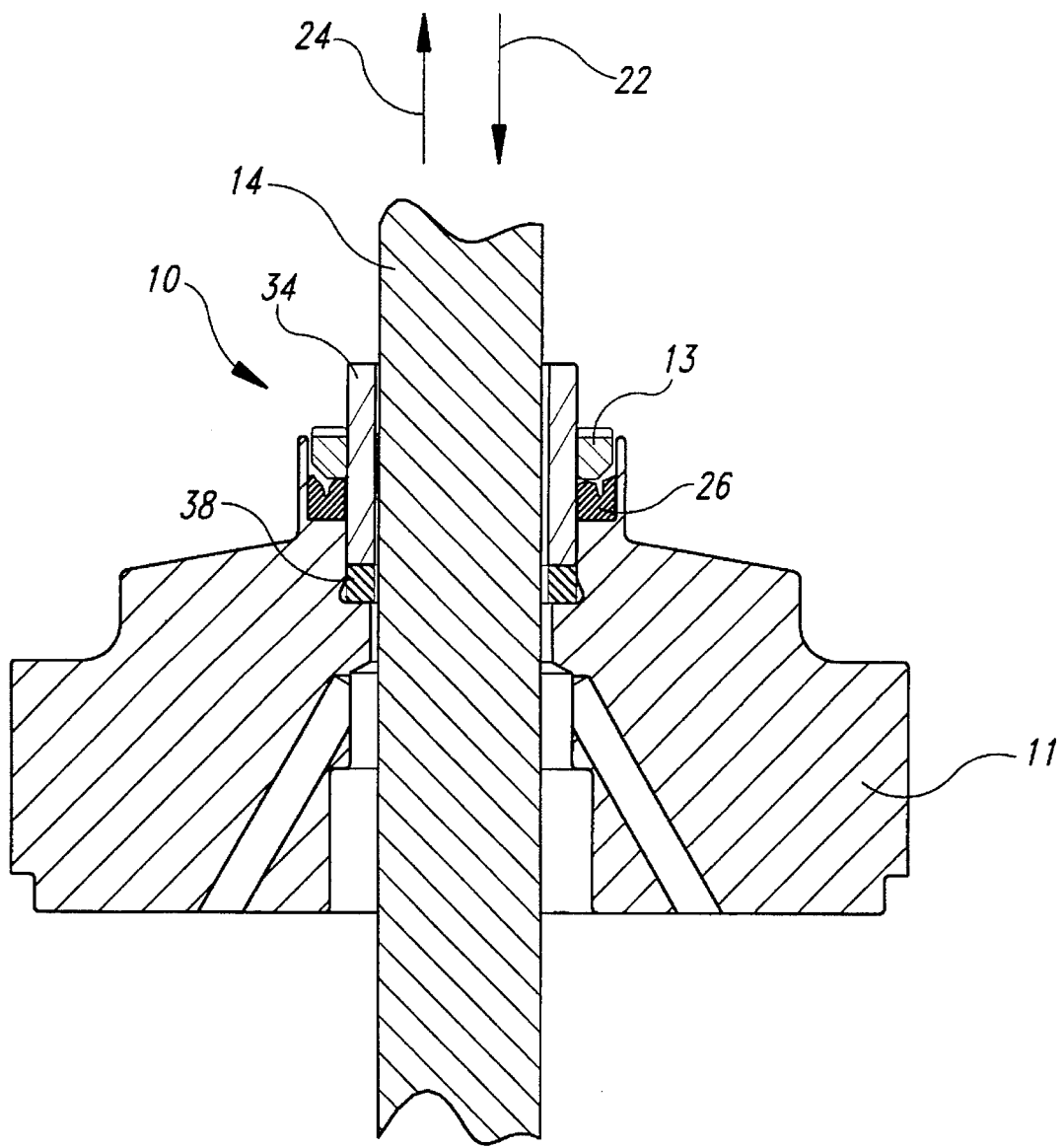
FIG. 1 is a cross-sectional plan view of a seal assembly provided in accordance with a preferred embodiment of the present invention.
Figure 2:
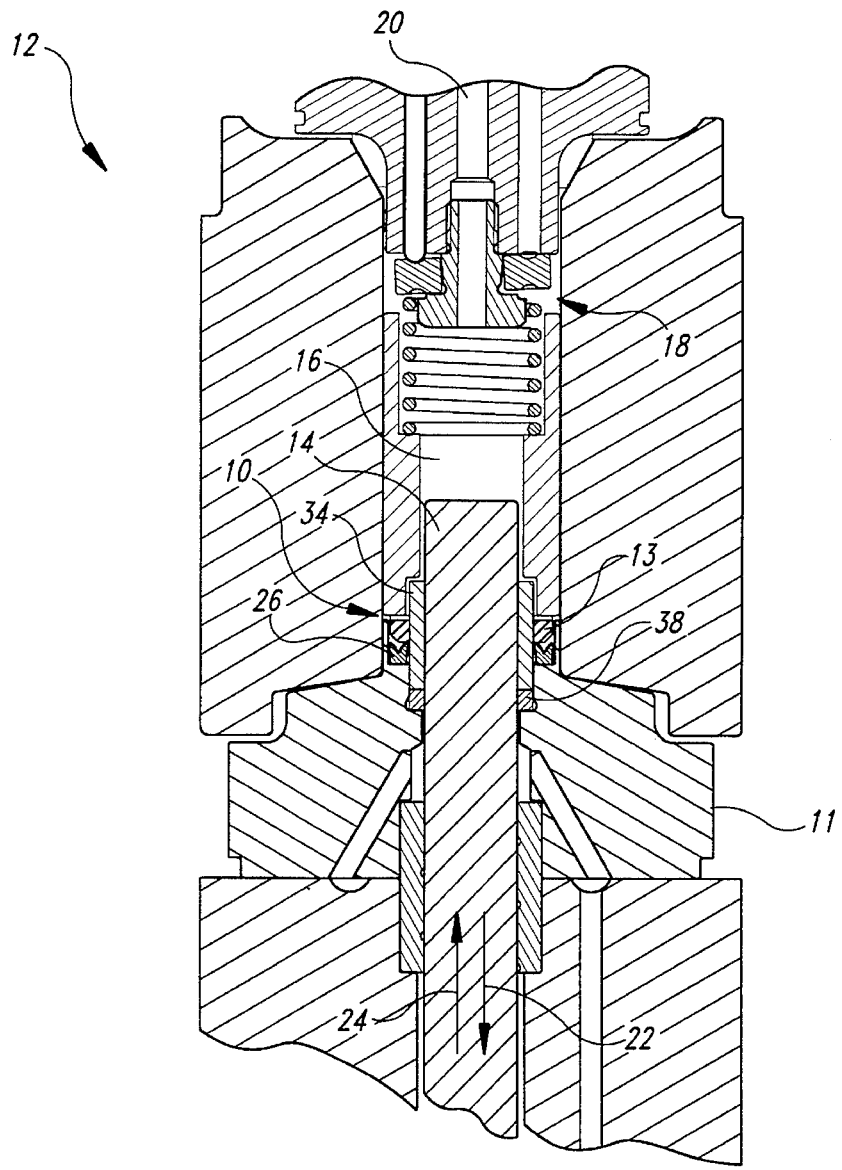
FIG. 2 is a cross-sectional plan view of the seal assembly of FIG. 1 incorporated into a high-pressure pump.

FIG. 1 illustrates a sealing assembly 10 provided in accordance with a preferred embodiment of the present invention. As illustrated in FIG. 2, the sealing assembly 10 may be used in the context of an ultrahigh-pressure pump 12, the pump having a plunger 14 that reciprocates in a chamber 16, having an intake stroke 22 and a pumping stroke 24. During the intake stroke designated by reference arrow 22, the plunger 14 draws a volume of fluid into the chamber 16 via an inlet valve 18. During the pumping stroke designated by reference arrow 24, the plunger 14 pressurizes the fluid in the chamber 16 and discharges it through passageway 20 to an outlet valve and outlet chamber (not shown). Fluid may be pressurized in this manner up to and beyond 40,000 psi. In order for the pump 12 to function as desired, it is necessary to provide adequate sealing and prevent the leakage of fluid from the pressurization chamber 16.

Currently available sealing methods use a high-pressure seal in conjunction with a low-pressure seal, the low-pressure seal being used to initiate the contact stresses necessary for the high-pressure seal to function at ultrahigh pressures. This is commonly referred to as a low-pressure seal "energizing" the high-pressure seal. In one currently available system, the low-pressure seal is an o-ring. However, such systems have unacceptably high failure rates which applicants believe is due to the fact that pressurized fluid leaks past the o-ring from the pressurization chamber, such that when the pressure in the chamber drops during the intake stroke, the pressurized fluid acts against the o-ring, the pressure differential thereby displacing or damaging the o-ring and eventually causing the seal to fail.

Another currently available sealing system uses an o-ring in conjunction with a vent hole, as described in U.S. Pat. No. 5,111,736. Although this system provides acceptable results, applicants believe that this system is not optimal, because the vent hole may allow pressurized fluid to leak past the low-pressure seal, thereby reducing the effectiveness of the seal. Furthermore, applicants believe that the edges of the vent hole abrade the o-ring, thereby shortening the life of the o-ring and the sealing assembly.

Figure 3:
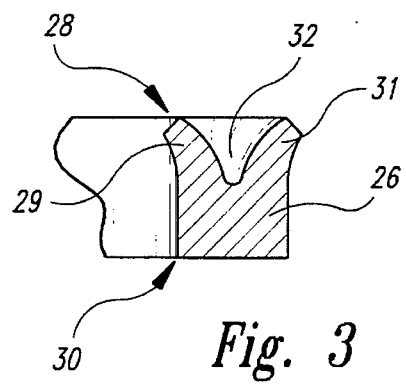
FIG. 3 is a cross-sectional plan view of a seal used in the seal assembly of FIG. 1.

These disadvantages are overcome in accordance with a preferred embodiment of the present invention, by providing a low-pressure seal 26 to energize a high-pressure seal 34, the low-pressure seal having a generally "u" shaped cross section, and being made of a deformable, resilient material. As best seen in FIG. 3, the "u" shaped or u-cup seal 26 is provided with a first side or end 28 and a second side or end 30. A groove 32 is created by the u-shaped cross-section and is provided in the first end 28 of seal 26, such that the first end 28 is divided generally into an inner ring 29 and an outer ring 31. As pressurized fluid acts against the first end 28 of seal 26 during the pressurization stroke 24, rings 29 and 31 expand outwardly against sleeve seal 34 and seal carrier 11, thereby substantially preventing the leakage of fluid past seal 26. If any pressurized fluid does leak past the seal 26, it will act against the second end 30 of the seal, such that the seal 26 will be subjected to a pressure differential when the pressure in chamber 16 drops during intake stroke 22. However, when this occurs, rings 29 and 31 compress inwardly on groove 32, thereby allowing the pressurized fluid to flow back past the first side 28 of seal 26, thereby preventing the pressurized fluid from displacing or damaging the u-cup seal 26. By providing a low-pressure seal in accordance with a preferred embodiment of the present invention, therefore, the seal acts to seal in one direction only, and vents itself in the opposite direction.

Figure 4:
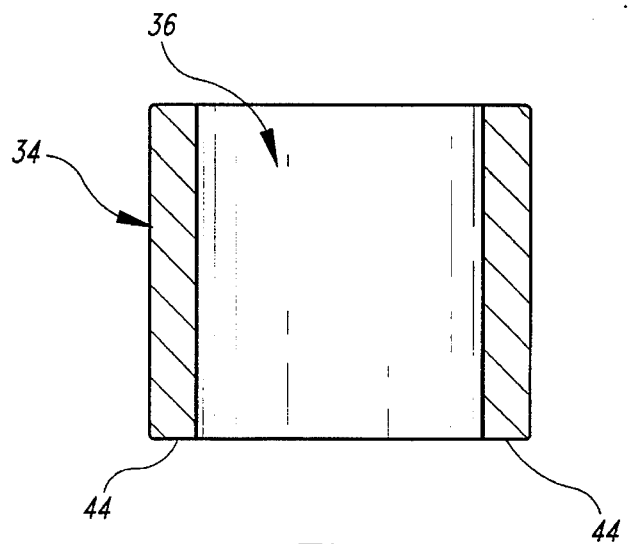
FIG. 4 is a cross-sectional plan view of a sleeve seal used in the seal assembly of FIG. 1.
Figure 6:
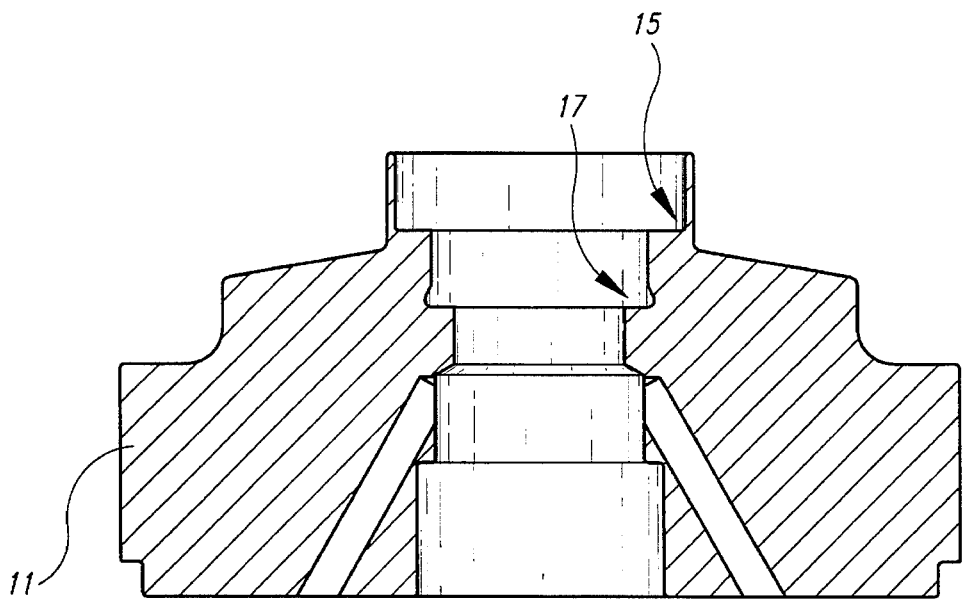
FIG. 6 is a cross-sectional plan view of a seal carrier used in the seal assembly of FIG. 1.

As further illustrated in FIGS. 1, 2 and 6, u-cup seal 26 is annular and surrounds sleeve seal 34, seal 26 being provided in a first bore 15 of seal carrier 11, and being held in position by spacer 13. As illustrated in FIG. 4, sleeve seal 34 is provided with an annular opening 36 through which plunger 14 reciprocates, sleeve seal 34 providing sealing at ultrahigh pressures, and being activated by the low-pressure u-cup seal 26.

Figure 5:
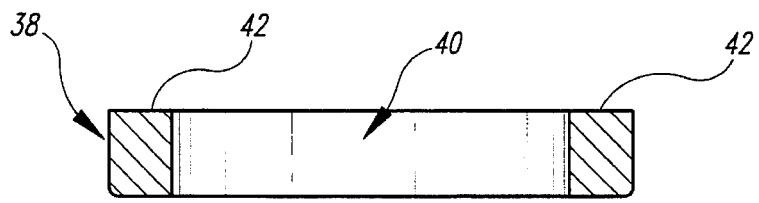
FIG. 5 is a cross-sectional plan view of a backup ring used in the seal assembly of FIG. 1.

As best seen in FIGS. 1 and 5, sleeve seal 34 is supported by backup ring 38, backup ring 38 having an annular opening 40 through which plunger 14 passes. Sleeve seal 34 and backup ring 38 are positioned in a second bore 17 of seal carrier 11, and are aligned and configured such that an end surface 42 of backup ring 38 and an end surface 44 of sleeve seal 34 abut each other, and are substantially flush.

An inner diameter of backup ring 38 is slightly larger than an outer diameter of plunger 14, such that a small gap is created, on the order of 3–4 one-thousands of an inch. Given the ultrahigh pressures acting against the sleeve seal 34, sleeve seal 34 wears against the top inner edge of backup ring 38, adjacent sleeve seal 34. This top inner edge of backup ring 38 is critical, given that if it degrades sufficiently, sleeve seal 34 will extrude through the gap between the backup ring and plunger, possibly resulting in damage to the plunger and seal failure. Therefore, by providing a sleeve seal 34 and backup ring 38 as described above and illustrated, manufacturing and installation of the seal assembly are simplified, given that backup ring 38 may be placed within bore 17 of the seal carrier 11, and sleeve seal 34 rests upon or bottoms out on backup ring 38. As sleeve seal 34 and backup ring 38 wear, they may be easily removed and replaced, thereby refreshing the seal assembly in a very cost-effective manner.

A self-venting seal assembly for use in an ultrahigh pressure pump has been shown and described. From the foregoing, it will be appreciated that, although embodiments of the invention have been described herein for purposes of illustration, various modifications may be made without deviating from the spirit and scope of the invention. Thus, the present invention is not limited to the embodiments described herein, but rather is defined by the claims which follow.

We claim:

1. An ultrahigh-pressure pump comprising:

a chamber having an inlet valve and an outlet valve;

a reciprocating plunger that draws fluid into the chamber on the intake stroke and pressurizes the fluid on a pumping stroke; and a seal made of a deformable, resilient material, and having a first side and a second side, a groove being provided in the first side such that the first side has an inner member and an outer member, the first side being exposed to pressurized fluid in the chamber, the inner member and the outer member flexing laterally outward from each other during the pumping stroke to substantially prevent fluid from passing from the first side of the seal to the second side of the seal, and the inner member and the outer member flexing laterally towards each other into the groove during the intake stroke, thereby allowing any pressurized fluid that may leak to the second side to flow from the second side to the first side of the seal.

2. The ultrahigh-pressure pump according to claim 1 wherein the seal is provided with a "u" shaped cross-section.

3. The ultrahigh-pressure pump according to claim 1, further comprising:

a sleeve seal having an annular opening through which the plunger reciprocates, the sleeve seal substantially preventing the leakage of fluid from the chamber at high pressures and the sleeve seal being energized by the seal, the seal being adapted to initially seal against the leakage of fluid from the chamber as the pumping stroke begins to pressurize the fluid.

4. The ultrahigh-pressure pump according to claim 3, further comprising:

a backup ring provided with an annular opening through which the plunger passes, the backup ring and the sleeve seal being aligned and configured such that an annular end surface of the sleeve seal and an annular end surface of the backup ring abut each other and are substantially flush.

5. An ultrahigh-pressure pump comprising:

a chamber having an inlet valve and an outlet valve;

a reciprocating plunger that draws fluid into the chamber on an intake stroke and pressurizes the fluid on a pumping stroke;

a sleeve seal provided with an annular opening through which the plunger passes;

a backup ring provided with an annular opening through which the plunger passes, an end surface of the sleeve seal being substantially flush with an end surface of the backup ring;

a second seal adjacent the sleeve seal, the second seal having a first end and a second end, and a "u" shaped cross-section, an annular groove created by the "u" shaped cross-section being provided in the first end of the seal such that the first end is substantially divided into an inner ring and an outer ring, the first end of the seal being exposed to the pressurized fluid in the chamber, such that when the plunger moves in the pumping stroke, the inner and outer rings expand outwardly thereby substantially preventing fluid from flowing past it from the first end to the second end, and when the plunger moves in the intake stroke, the inner and outer rings compress inwardly, thereby allowing any pressurized fluid that may have leaked to the second end of the second seal to flow back from the second end to the first end.

6. A sealing assembly for use in an ultrahigh-pressure pump having a plunger that reciprocates in a chamber, the plunger drawing fluid into the chamber on an intake stroke and pressurizing the fluid on a pumping stroke, comprising:

a seal made of a deformable, resilient material, and having a first side and a second side, a groove being provided in the first side such that the first side has an inner member and an outer member, the first side being exposed to pressurized fluid in the chamber, the inner member and the outer member flexing laterally outward from each other during the pumping stroke to substantially prevent fluid from passing from the first side of the seal to the second side of the seal, and the inner member and the outer member flexing laterally towards each other into the groove during the intake stroke, thereby allowing any pressurized fluid that may leak to the second side to flow from the second side to the first side of the seal.

7. The sealing assembly according to claim 6 wherein the seal is provided with a "u" shaped cross-section.

8. The sealing assembly according to claim 6, further comprising:

a sleeve seal having an annular opening through which the plunger reciprocates, the sleeve seal substantially preventing the leakage of fluid from the chamber at high pressures and the sleeve seal being energized by the seal, the seal being adapted to initially seal against the leakage of fluid from the chamber as the pumping stroke begins to pressurize the fluid.

9. The sealing assembly according to claim 8, further comprising:

a backup ring provided with an annular opening through which the plunger passes, the backup ring and the sleeve seal being aligned and configured such that an annular end surface of the sleeve seal and an annular end surface of the backup ring abut each other and are substantially flush.

10. An ultrahigh-pressure pump comprising:

a chamber having an inlet valve and an outlet valve;

a reciprocating plunger that draws fluid into the chamber on the intake stroke and pressurizes the fluid on a pumping stroke;

a seal having a first side and a second side, the first side being exposed to pressurized fluid in the chamber, the seal being adapted to substantially prevent fluid from passing from the first side of the seal to the second side of the seal during the pumping stroke, and the seal being adapted to allow any pressurized fluid that may leak to the second side to flow from the second side to the first side of the seal, during the intake stroke; and a sleeve seal having an annular opening through which the plunger reciprocates, the sleeve seal substantially preventing the leakage of fluid from the chamber at high pressures and the sleeve seal being energized by the seal, the seal being adapted to initially seal against the leakage of fluid from the chamber as the pumping stroke begins to pressurize the fluid.

11. The ultrahigh-pressure pump according to claim 10, further comprising:

a backup ring provided with an annular opening through which the plunger passes, the backup ring and the sleeve seal being aligned and configured such that an annular end surface of the sleeve seal and an annular end surface of the backup ring abut each other and are substantially flush.

12. A sealing assembly for use in an ultrahigh-pressure pump having a plunger that reciprocates in a chamber, the plunger drawing fluid into the chamber on an intake stroke and pressurizing the fluid on a pumping stroke, comprising:

a seal having a first side and a second side, the first side being exposed to pressurized fluid in the chamber, the seal being adapted to substantially prevent fluid from passing from the first side of the seal to the second side of the seal during the pumping stroke, and the seal being adapted to allow any pressurized fluid that may leak to the second side to flow from the second side to the first side of the seal, during the intake stroke; and a sleeve seal having an annular opening through which the plunger reciprocates, the sleeve seal substantially preventing the leakage of fluid from the chamber at high pressures and the sleeve seal being energized by the seal, the seal being adapted to initially seal against the leakage of fluid from the chamber as the pumping stroke begins to pressurize the fluid.

13. The sealing assembly according to claim 12, further comprising:

a backup ring provided with an annular opening through which the plunger passes, the backup ring and the sleeve seal being aligned and configured such that an annular end surface of the sleeve seal and an annular end surface of the backup ring abut each other and are substantially flush.

* * * * *